United States Patent [19]
Anderson

[11] Patent Number: 5,389,780
[45] Date of Patent: Feb. 14, 1995

[54] OPTICAL TORQUE SENSOR UTILIZING SINGLE POLARIZING AREA FILTERS AND MECHANICAL AMPLIFIER

[76] Inventor: Philip M. Anderson, 37 Winding Way, Madison, N.J. 07940

[21] Appl. No.: 36,427

[22] Filed: Mar. 24, 1993

Related U.S. Application Data

[63] Continuation-in-part of Ser. No. 883,219, May 14, 1992, abandoned.

[51] Int. Cl.6 .............................................. G02F 1/01
[52] U.S. Cl. .................................. 250/225; 250/231.13
[58] Field of Search ............ 250/225, 214 PR, 231.13, 250/231.14, 231.16, 231.1, 237 G; 356/368, 152, 138, 364, 375

[56] References Cited

U.S. PATENT DOCUMENTS

| | | | |
|---|---|---|---|
| 3,407,305 | 10/1968 | Sterry | 250/225 |
| 3,938,890 | 2/1976 | Flavell | 250/225 |
| 4,637,264 | 1/1987 | Takahashi et al. | 250/231.1 |
| 4,650,996 | 3/1987 | Maehara et al. | 250/225 |

Primary Examiner—David C. Nelms
Assistant Examiner—Que T. Le
Attorney, Agent, or Firm—Ernest D. Buff

[57] ABSTRACT

Torque in a rotating or stationary shaft is measured by apparatus that includes: a light source for emitting light along a light path; a light detector for receiving the light; a first polarizing filter comprising a single polarizing area and having a first axis-of-polarization attached at a first point along the shaft within the light path and between the light source and the light detector; and a second polarizing filter comprising a single polarizing area and having a second axis-of-polarization, attached at a second point along the shaft and within the light path and between the light source and the light detector. Twist in the shaft produces a change in angle between the first and the second axis-of-polarization, which change in angle produces a change in intensity of the light.

12 Claims, 10 Drawing Sheets

OPTICAL TORQUE SENSOR UTILIZING SINGLE POLARIZING AREA FILTERS AND MECHANICAL AMPLIFIER

CROSS-REFERENCE TO RELATED APPLICATIONS

This application is a continuation-in-part of U.S. application Ser. No. 883,219, filed May 14, 1992, now abandoned.

BACKGROUND OF THE INVENTION

1. Field of the Invention

The present invention relates to the field of torque measurement; and more particularly, to means for determining the amount of twist that occurs in a shaft under torsion.

2. Description of the Prior Art

When torque is applied to a shaft, two principal lines of stress are induced along helical lines which are orthogonal to each other on the surface of the shaft. Various different methods of torque measurement have been available, but no method is totally satisfactory. Two common methods of measuring torque, strain gage and optical, are well described in the literature. See "Sensor and Analyzer Handbook," by Harry Norton, Prentice Hall, 1982, pp 131-142.

Torque is most accurately measured by bonding strain gages in a cross arrangement along the helical lines of compression and tension. The strain gages are electrically configured in a balance-bridge and coupled to measuring electronics via slip rings or noncontacting rotary transformers. Generally, these cross arrangements are difficult to implement and usually require custom installation. In another variation, disclosed by Gurenko and Krutkis in Soviet patent 2,493,268, a light source is used to couple the gage signal to a stationary photodiode.

In optical torque transducers, light beams, code patterns and light sensors are used to convert the differential angular displacement between two positions on a shaft, due to applied torque, into an output signal. Specifically, identical patterns made of light reflecting strips are arranged circumferentially around the shaft at two different locations. The patterns are illuminated by laser diodes and the reflected light is sensed by photocell. The output of each photocell is a pulse train and the phase difference between them is a measure of the torque. U.S. Pat. No. 4,767,925 to Kawamoto discloses a similar device in which a pair of light emitting and receiving elements produce an output depending on the amount of light transmitted due to the relative rotation of two slotted disks. U.S. Pat. No. 4,637,264 to Takahashi et al. discloses the use of two plates, each having an optical grid, which generate a Moire pattern that depends on the relative angle between the two plates. A connecting member is attached to the shaft solely at a point away from one of the slotted disks. The device disclosed by Takahashi et al. has a serious drawback in that the disk tends to oscillate since the connecting member is only supported at one end. These oscillations put the two disks out of parallel and introduce an error in the torque angle. Further the device of Takahashi et al. requires a hermetically sealed unit as well as an oil seal, since it is sensitive to dirt and dew. U.S. Pat. No. 4,433,585 to Levine discloses passing a beam of light through two diffraction gratings placed at different locations along a shaft and sensing the phase of the two resulting beams. U.S. Pat. No. 3,938,890 to Flavel discloses the use of two light transmission controlling disks, one of which is comprised of two areas. Each of the two areas of the plural area disk has a different direction of optical polarization, so that in combination, the controlling disks provide three areas in all. This configuration of Flavel makes possible a linear output for unspecified small angles of torque. The polarizing disks required by Flavel are expensive and the difficulty of alignment further increases the cost. Due to the complexity of the polarizing disks, very complicated detection means are required to increase sensitivity by eliminating aberrations in the polarizers. U.S. Pat. No. 4,650,996 to Maehara et al. discloses an angle transducer employing two polarizing disks, two light sources, and two light detectors. Maehara et al. further discloses the use of a mirror in order to have all sources and detectors on a common side of the disk. Even in its minimum configuration, Maehara et al. requires at least two light sources, and two light detectors. Since measurement of torque involves the determination of angle at two different locations along a shaft, two such devices as Maehara et al. describes would be required two measure torque. The optical torque sensors of the prior art are expensive, and not robust devices, as they require complicated detection schemes and exact alignment. Further they are not provided with a means for installation in the field.

The literature discloses a capacitive torque sensor consisting of two encoders either mounted perpendicular to the shaft at each end, or mounted circumferentially at two closely placed points along the shaft. See "Interest in Misfire Detection Technology Grows," Automotive Electronics Journal, Nov. 6, 1989, pg 12. Each encoder has two parts: a stator that consists of up to 256 radial fingers that are alternately charged; and a rotor that is mounted on the shaft. As the shaft turns, the rotor's potential switches between positive and negative at a frequency proportional to speed. A disk, in the center of the stator, electrically isolated from the charged fingers collects the signal. Like the optical torque sensor, the twist of the shaft is determined by measuring the phase difference between the two encoders. Also like the optical sensor this device requires exact alignment.

The magnetic properties of most ferromagnetic materials change with the application of stress to such an extent that stress may be ranked with field strength and temperature as one of the primary factors affecting magnetic change. Magnetostriction is a measure of the stress sensitivity of a material's magnetic properties. Magnetic based torque sensors take advantage of the magnetostrictive properties of ferromagnetic metals, such as carbon steel. See "Noncontact Magnetic Torque Transducer", Sensors, 11/90, pp. 37-40. These sensors make a contactless measurement of changes of magnetic permeability in shaft materials, which are caused by torsional stress. In place of strain gages, magnetic flux is directed into the shaft and along the helical lines of compression and tension. A positive magnetostriction shaft experiencing torsion will exhibit increased permeability along the line of tension and decreased permeability along the line of compression. At low stress levels the permeability is nearly linear with stress, but varies dramatically at high stress. Another drawback of a magnetostrictive torque sensor is in the need for calibrating it individually with each shaft. This requirement is obvious because the torque measurement is made by means of the magnetostrictive properties of the shaft material and cannot be predetermined in the manufacture of the sensor by itself. The variability in magnetostrictive properties is usually correlated with the variability of the mechanical hardness of the material. Hardness variability of shaft materials typically ranges from +10 percent to +40 percent. The shaft-to-shaft variability problem has been addressed by adding either a sleeve or coating of a well defined and magnetically soft material, such as nickel, permalloy, or ferromagnetic amorphous alloys. See Sasada, Hiroike and Harada, Intermag '84, BE-03, IEEE Transactions on Magnetics, MAG 20, V5, pg 951. While this approach shows promise, installation can not be made in situ, and all magnetic materials, even the softest, can retain some magnetism leading to nonlinearities and drift. In addition, magnetic torque sensors are susceptible to electromagnetic interference.

SUMMARY OF THE INVENTION

The present invention provides means for measuring the torque in a rotating or stationary shaft. Generally stated, the invention provides an apparatus for measuring twist in a shaft under torsion, comprising: a light source for emitting light along a light path; a light detector for receiving the light; a first polarizing filter comprising only one polarizing area and having a first axis-of-polarization, attached at a first point along the shaft within the light path; and a second polarizing filter comprising only one polarizing area and having a second axis-of-polarization, attached at a second point along the shaft within the light path; each of the points of attachment of the first and second polarizing filters being located between the light source and the light detector, so that the twist in the shaft produces a change in angle between the first and the second axis-of-polarization, which change in angle produces a change in intensity of the light reaching the detector. Preferably, the angle between the first and the second axis of polarization ranges from 20° to 70°, and more preferably from 35° to 55°.

The invention further comprises a sleeve having a first and second end, over a length of the shaft, and having a first and second end, the first end of the sleeve is fixed to the first polarizing filter and the second end of the sleeve is fixed to the shaft, so that the angle between the first and the second axis of polarization is equal to the angular twist occurring between the second end of the sleeve and the second polarizing filter.

Advantageously, the apparatus of the present invention employs two polarizing disks, each having a single polarizing area, which results in a device that is uncomplicated, inexpensive, and rugged. It is linear over a wide range of torque angles, and employs a sleeve for increased sensitivity. The sleeve is split and provided with a means for application to the shaft in the field, and the sleeve is not subject to oscillation about the shaft. Such apparatus is simple to operate and install, and, owing to its optical nature, is insensitive to electromagnetic interference.

BRIEF DESCRIPTION OF THE DRAWINGS

The invention will be more fully understood and further advantages will become apparent when reference is made to the following detailed description of the preferred embodiment of the invention and the accompanying drawings, in which.

DESCRIPTION OF THE PREFERRED EMBODIMENTS

Generally, the invention provides a method and means for measuring torque on a shaft by monitoring the intensity of transmitted light through two polarizing filters disposed at two point along a shaft, and for mechanically amplifying the shaft twist. The method and means of the invention can be practiced and arranged in various ways.

The angle of rotation between the polarizing axes of two optically polarizing filters can be determined. The intensity I of light traversing two optically polarizing sheets is:

$$I = I_0 \cos^2 \phi,$$

where $I_0$ is the initial intensity and $\phi$ is the angle between the two polarizing axes. Using a light source and a light detector to measure the light intensity transmitted through the two filters, the intensity is measured as a function of cosine squared.

Figure 1:
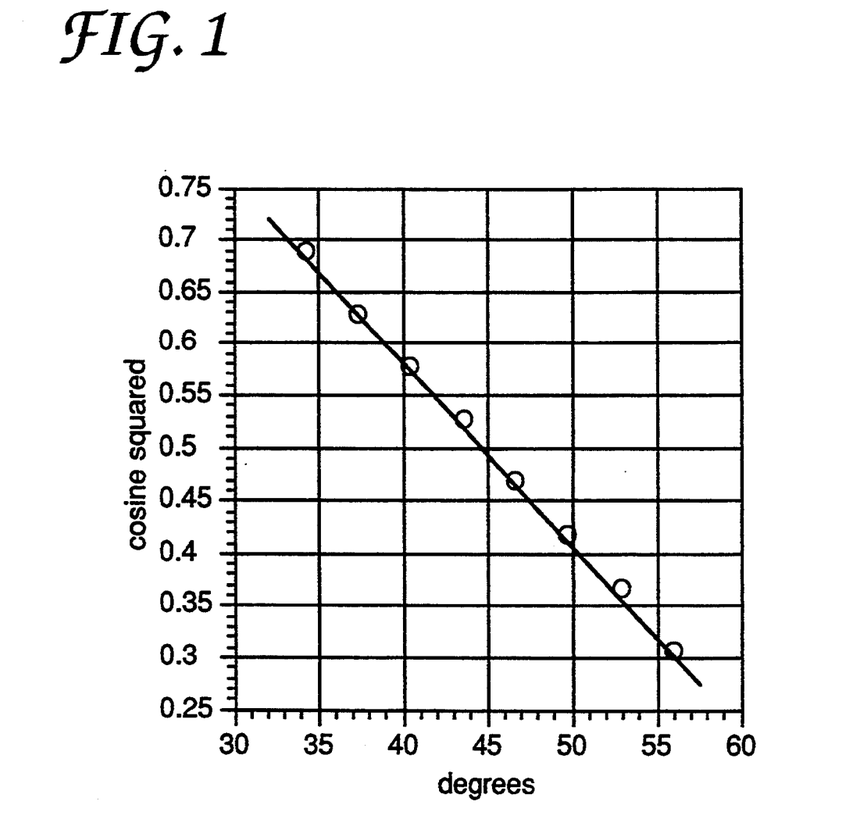
FIG. 1 is a graph showing shows the linearity around 45° of cosine squared versus angle.

While the cosine squared is of course nonlinear, it is very nearly linear around 45°. In fact, as shown in FIG. 1, 10° either side of 45° takes a linear fit with a correlation constant of $R^2 = 0.9946$.

Figure 2:
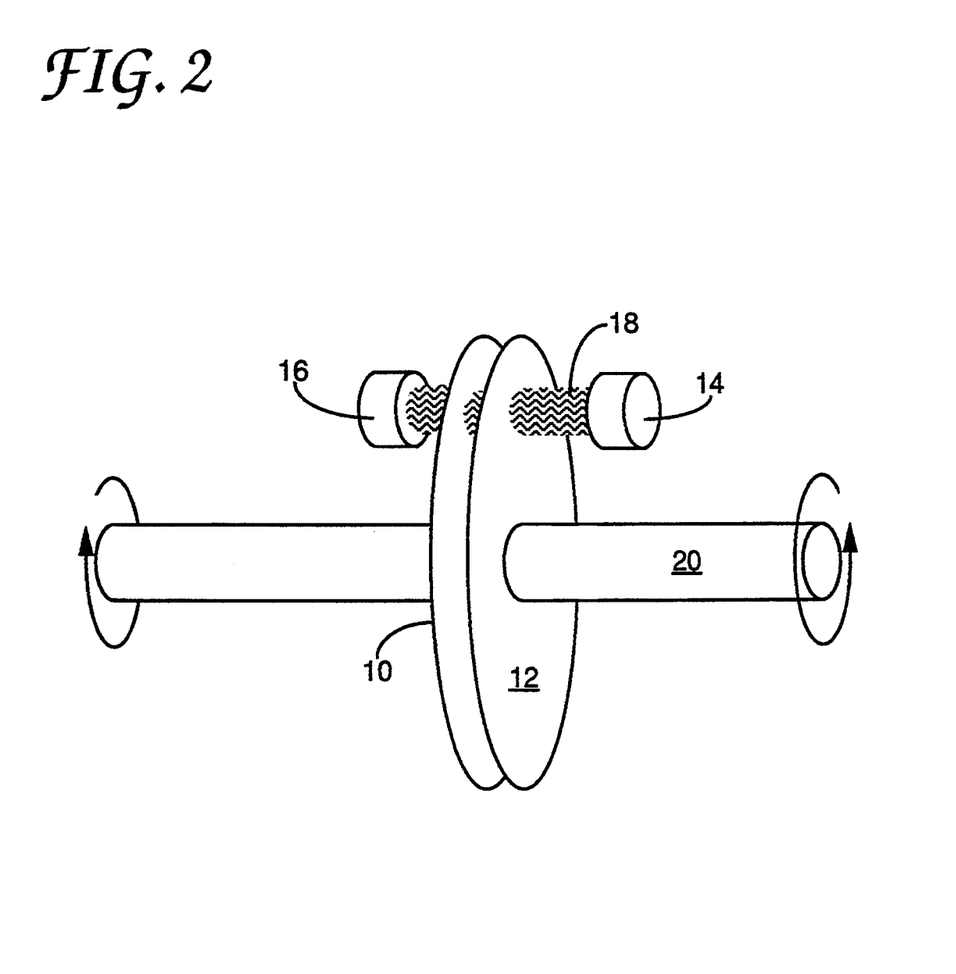
FIG. 2 is a perspective view of one embodiment of the torque sensor of this invention.

The first embodiment, shown in FIG. 2, comprises two polarizing filters 10, 12 mounted close together on a shaft 20. Each polarizing filters 10, 12 is comprised of a single polarizing area, with the result that each of polarizing filters 10, 12 has only one axis of polarization. A light source 14 and a light detector 16 are disposed on opposite sides of the two polarizing filters 10 and 12, and measure the intensity of light 18 transmitted through the two polarizing filters 10 and 12. Preferably, the axes of polarization of filters 10 and 12 are aligned 45° with respect to each other when no torsional stress exists in shaft 20. With only two polarizing areas and a wide range of linearity, alignment is simple. When torque is applied, shaft 20 twists and rotates polarizing filters 10 and 12 with respect to each other. The intensity of light 18 sensed by light detector 16 changes linearly around the 45° initial angle. The advantage of this embodiment is simplicity and linearity.

Lights source 14 is a member selected from the group consisting of light-emitting-diode, laser, laser diode, arc-light lamp, quartz lamp, halogen lamp, mercury vapor lamp, metal halide-mercury vapor lamp, sodium vapor lamp, fluorescent lamp, electroluminescent lamp, and tungsten filament lamp.

Light detector 16 is a member selected from the group consisting of photodiode, photocell, solar cell, photoconductor, phototransistor, photofet, charge-injection-device, and charge-coupled-device.

Figure 3:
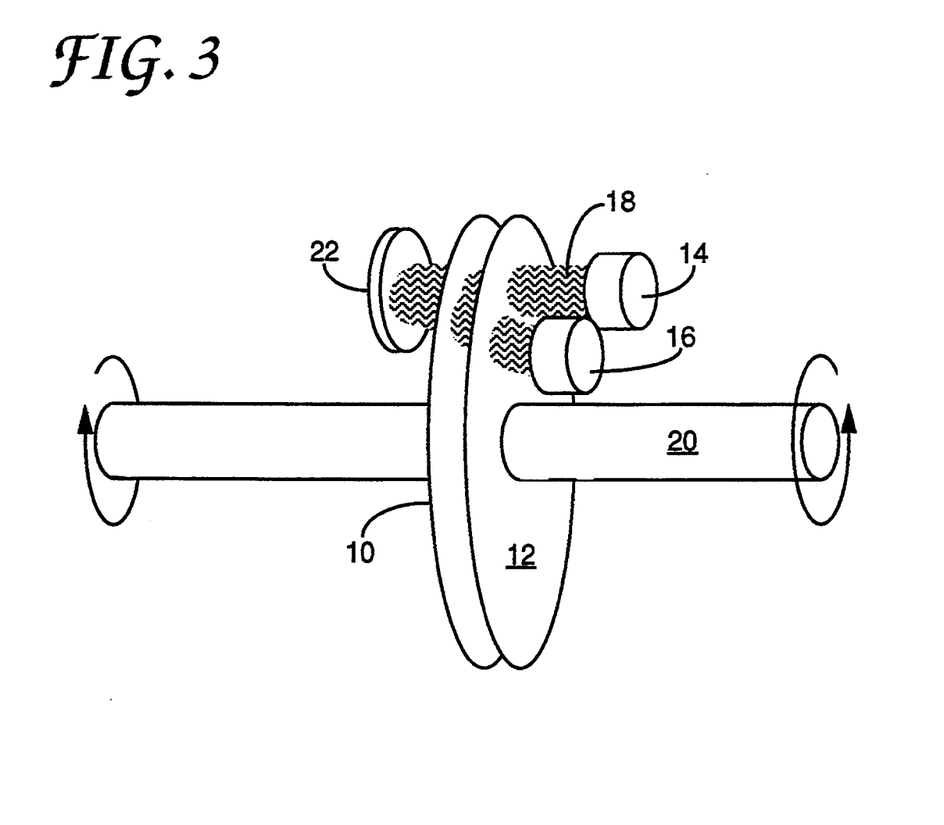
FIG. 3 is a perspective view of the torque sensor of FIG. 2 equipped with a mirror.

An alternative embodiment is shown in FIG. 3. Light source 14 and light detector 16 are disposed on one side of polarizing filters 10 and 12 and a mirror 22 is placed on the opposite side.

Figure 4:
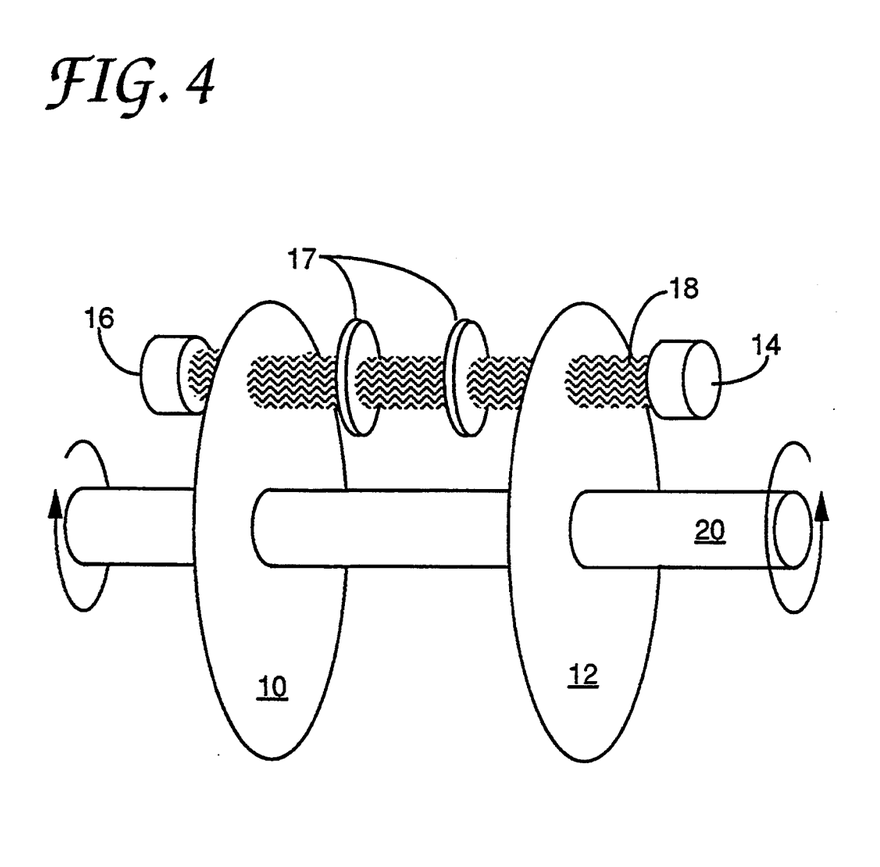
FIG. 4 is a perspective view of the torque sensor equipped with a focusing means.

The twist angle is generally small for normal torque in rotating machinery. Therefore another embodiment comprises polarizing filters 10 and 12 mounted far apart. In this way, the twist angle is increased by the ratio of increased distance between polarizing filters 10 and 12. For example, a twist of 0.01° for a separation of 0.1 inch becomes 0.4° when polarizing filters 10 and 12 are 4 inches apart. As the distance between polarizing filters 10 and 12 increases, brighter and or more coherent light sources are required to have sufficient intensity to be detected easily, or as shown in FIG. 4, focusing lenses 17, or optical fibers, are placed between filters 10 and 12 as a means of transporting light 18 between polarizing filters 10 and 12 when polarizing filters 10 and 12 are placed far apart. The advantage of this embodiment is additional linearity and greater sensitivity.

Figure 5:
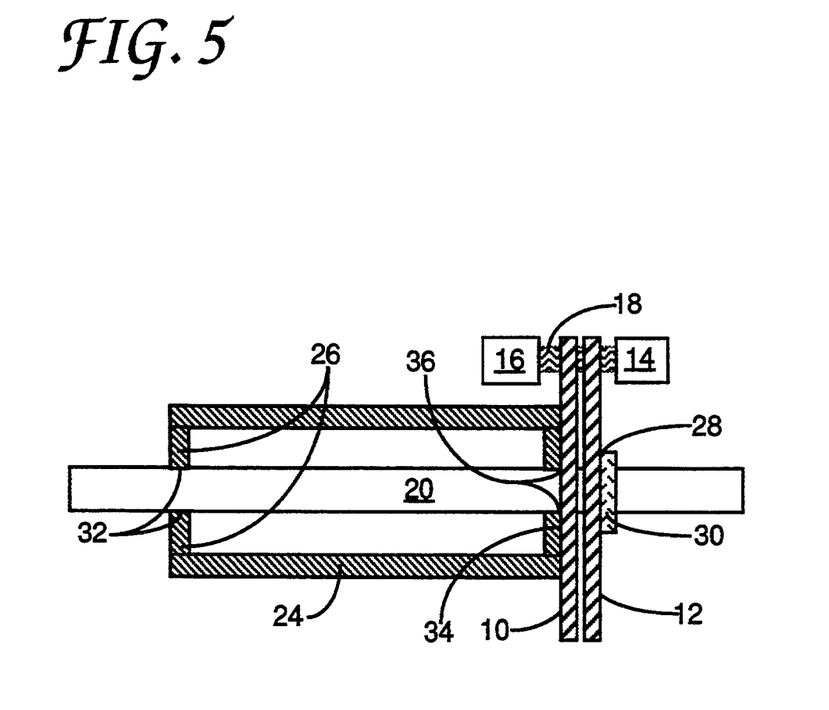
FIG. 5 is a cross-sectional side view of the torque sensor provided with a sleeve.
Figure 6:
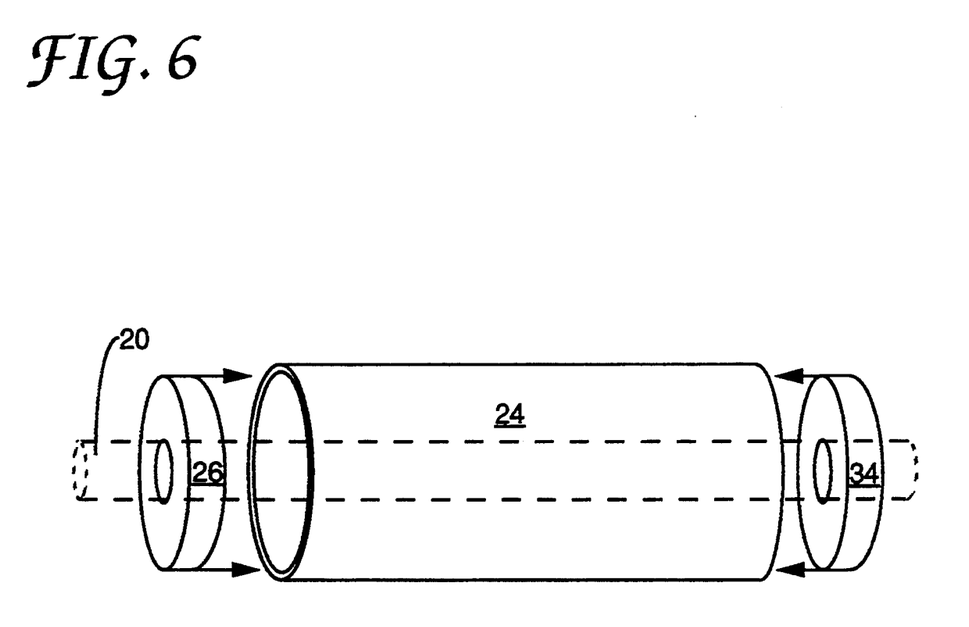
FIG. 6 is a perspective view of the sleeve shown in FIG. 5.
Figure 7:
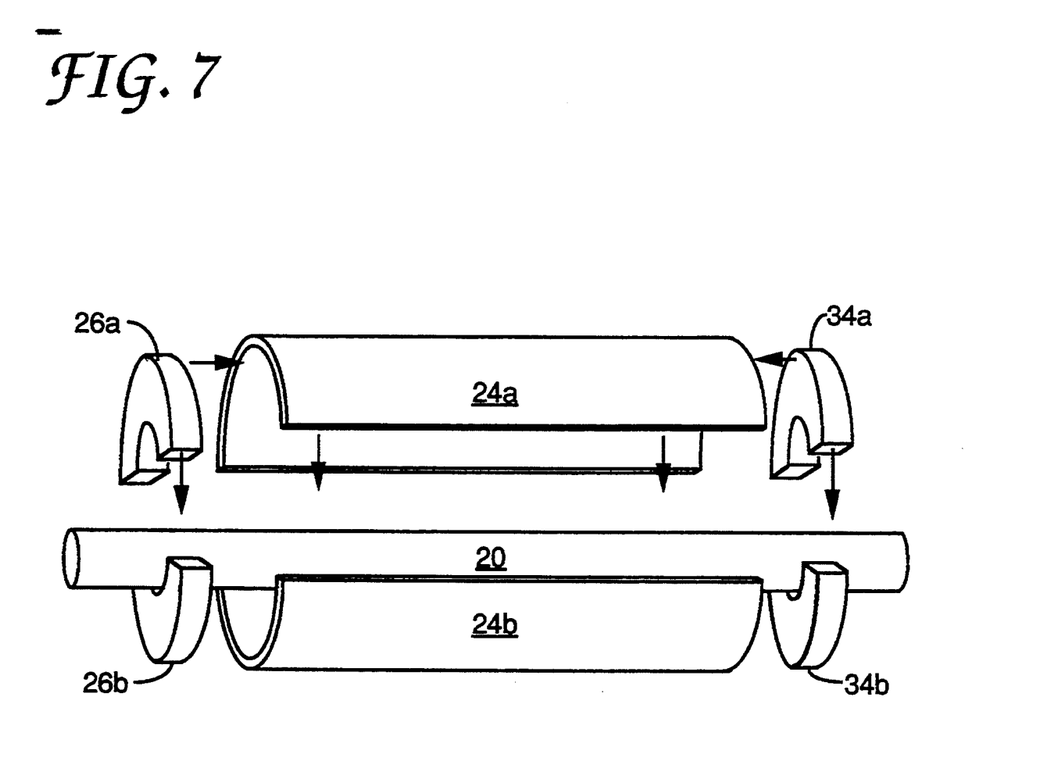
FIG. 7 is a perspective view of a split sleeve adapted for in-situ installation.

The third embodiment, shown in FIG. 5, comprises polarizing filters 10 and 12 mounted close together, but having only one filter 12 attached directly to shaft 20. The second filter 10 is attached to a cylindrical sleeve 24 placed around a section of shaft 20. The sleeve 24 has collars 26 and 34 fixed at opposite ends. Collar 26 is also fixed at 32 to shaft 20. Collar 34 is not fixed to shaft 20 and is free to rotate at circumference 36 of shaft 20. Therefore filter 10 experiences twist of shaft 20 as if it were connected at point 32. In this way, the device measures the twist between filter 12 fixed to shaft 20 and the opposite end of the sleeve at point 32. Thus achieving a mechanical amplification and without the need for any additional optics. Since no torque stress is transmitted through sleeve 20, no exotic method of fastening is required. An exploded view of sleeve 24 with collars 26 and 34 is shown in FIG. 6. Alternatively, the sleeve 24 and collars 26 and 34 are in a slit configuration facilitating application to the shaft 20 in-situ. This configuration is shown in FIG. 7, wherein half-collar 26a and half-collar 34a are fixed to opposite ends of half sleeve 24a. Similarly, half-collar 26b and half-collar 34b are fixed to opposite ends of half-sleeve 24b. Half collars 26a and 26b are fixed to each other and to shaft 20, while half collars 34a and 34b are fixed to each other but not to shaft 20.

Figure 8:
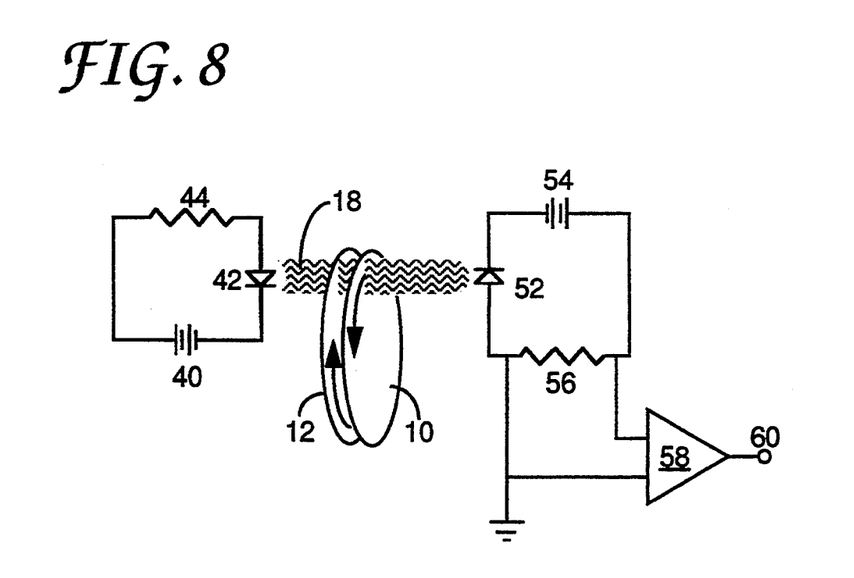
FIG. 8 is a circuit diagram of a light source and detector.

A device based on the third embodiment, shown in FIG. 5, was constructed and tested. The polarizing filter were 8.2 cm diameter by 0.76 mm and cut from thick commercial grade sheet. FIG. 8 shows the circuit used to generate and detect intensity of light 18 transmitted through polarizing filters 10 and 12. LED 42 is connected in series with voltage supply 40 and current limiting resistor 44. LED 42 generates light 18. Silicon photodiode 52 is in series with voltage supply 54 and resistor 56. The current through resistor 56 is a function of the intensity of light 18 reaching detector 52. Amplifier 58 amplifies the voltage drop across resistor 56. Output voltage 60 from amplifier 58 is a function of angular difference between the polarizing axes of filters 10 and 12.

Figure 9:
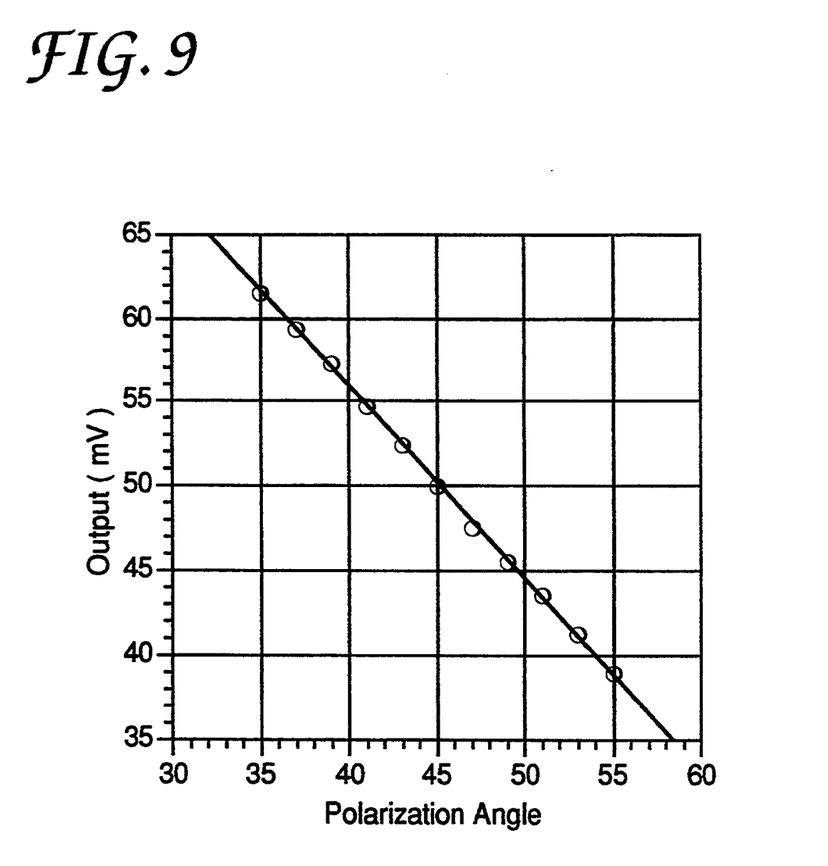
FIG. 9 is a plot of output voltage versus angle.

In the first measurement, collar 26 was left loose on shaft 20. The amplified voltage drop 60 was measured as the polarizing axis of filter 10 was moved, with respect to filter 12, 10° either side of 45°. Voltage 60 was linear verses the polarization angle as shown in FIG. 9 and had a correlation constant of $R^2 = 0.9994$.

Figure 10:
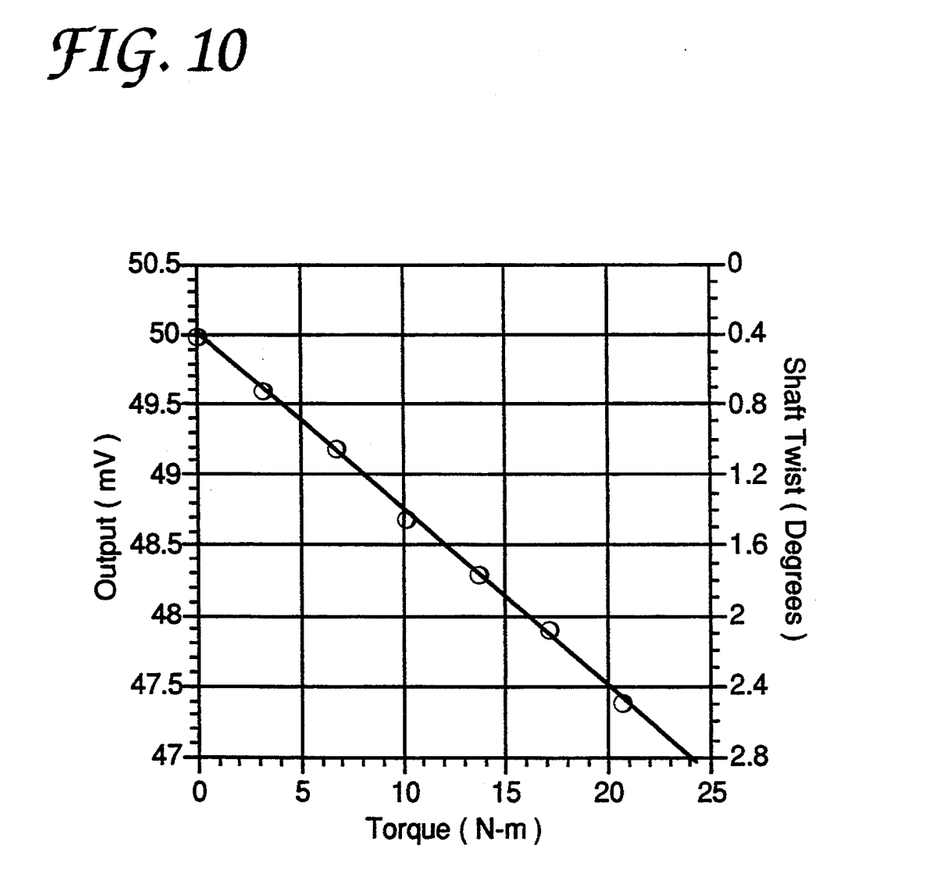
FIG. 10 is a plot of output voltage and twist angle versus applied torque.

Next, collar 26 was secured to shaft 20 by epoxy and static torque applied to shaft 20. Voltage 60 was linear verses the applied torque and had a correlation constant of $R^2 = 0.9992$ Sensitivity of the device was 0.07° of shaft twist. FIG. 10 shows circuit output and shaft twist versus applied torque.

The apparatus of the present invention employs two polarizing disks, each having a single polarizing area, which results in a device that is uncomplicated, inexpensive, and rugged. It is linear over a wide range of torque angles, and employs a sleeve for increased sensitivity. The sleeve is split and provided with a means for application to the shaft in the field, and the sleeve is not subject to oscillation about the shaft. Such apparatus is simple to operate and install, and, owing to its optical nature, is insensitive to electromagnetic interference.

The invention has been described in detail herein above with particular reference to the preferred embodiments thereof, but it will be understood that additional variations and modifications may suggest themselves to one skilled in the art, all falling within the scope of the invention as defined by the subjoined claims.

What is claimed is:

1. An apparatus for measuring twist in a shaft under torsion, comprising:
   (a) a light source for emitting light along a light path;
   (b) a light detector for receiving said light;
   (c) a first polarizing filter comprising a single polarizing area and having a first axis-of-polarization, attached at a first point along said shaft within said light path and between said light source and said light detector;
   (d) a second polarizing filter comprising a single polarizing area and having a second axis-of-polarization, attached at a second point along said shaft within said light path and between said light source and said light detector, whereby said twist produces a change in angle between said first and said second axis-of-polarization, and said change in angle produces a change in intensity of said light received by said light detector: and
   (e) a sleeve disposed over a length of said shaft and having a first and second end, said first end of said sleeve being fixed to said first polarizing filter and said second end of said sleeve being fixed to said shaft, so that said angle between said first and said second axis of polarization is equal to angular twist occurring between said second end of said sleeve and said second polarizing filter, said sleeve comprising a cylinder having a collar at each end thereof, and being slit in half for application to said shaft in-situ.

2. An apparatus as recited in claim 1, wherein said angle between said first and said second axis of polarization ranges from 20° to 70°.

3. An apparatus as recited in claim 1, further comprising a focusing means disposed within said light path between said first and said second polarizing filters.

4. An apparatus as recited in claim 3, wherein said focusing means comprises at least one lens.

5. An apparatus as recited in claim 3, wherein said focusing means comprises at least one optical fiber.

6. An apparatus as recited in claim 2, wherein said angle between said first and said second axis of polarization ranges from 35° to 55°.

7. An apparatus for measuring twist in a shaft under torsion, comprising:
   (a) a light source for emitting light along a light path;
   (b) a mirror disposed within said light path;
   (c) a first polarizing filter comprising a single polarizing area and having a first axis-of-polarization, attached at a first point along said shaft within said light path and between said light source and said mirror;
   (d) a second polarizing filter comprising a single polarizing area and having a second axis-of polarization, attached at a second point along said shaft within said light path and between said light source and said mirror;
   (e) a light detector for receiving said light and being disposed on the same side of said first and second polarizing filters as said light source, whereby said twist produces a change in angle between said first and said second axis-of-polarization, which change in angle produces a change in intensity of said light; and
   (f) a sleeve disposed over a length of said shaft and having a first and second end, said first end of said sleeve being fixed to said first polarizing filter and said second end of said sleeve being fixed to said shaft, so that said angle between said first and second axis of polarization is equal to angular twist occurring between said second end of said sleeve and said second polarizing filter, said sleeve comprising a cylinder having a collar at each end thereof, and being slit in half, for application to said shaft in-situ.

8. An apparatus as recited in claim 7, wherein said light source is a member selected from the group consisting of light-emitting-diode, laser, laser diode, arc-light lamp, quartz lamp, halogen lamp, mercury vapor lamp, metal halide-mercury vapor lamp, sodium vapor lamp, fluorescent lamp, electroluminescent lamp, and tungsten filament lamp.

9. An apparatus as recited in claim 7, wherein said light detector is a member selected from the group consisting of photodiode, photocell, solar cell, photoconductor, phototransistor, photofet, charge-injection-device, and charge-coupled-device.

10. An apparatus as recited in claim 7, wherein said angle between said first and said second axis of polarization is ranges from 20° to 70°.

11. An apparatus as recited in claim 7, further comprising a focusing means disposed within said light path and between said first and said second polarizing filters.

12. An apparatus as recited in claim 10, wherein said angle between said first and said second axis of polarization ranges from 35° to 55°.

* * * * *